United States Patent
Ohashi et al.

(10) Patent No.: US 11,798,716 B2
(45) Date of Patent: Oct. 24, 2023

(54) RARE EARTH SINTERED MAGNET

(71) Applicant: Shin-Etsu Chemical Co., Ltd., Tokyo (JP)

(72) Inventors: Tetsuya Ohashi, Echizen (JP); Hiroki Iida, Echizen (JP); Koichi Hirota, Echizen (JP); Hajime Nakamura, Echizen (JP); Mikio Yoshida, Echizen (JP); Kazuya Fukui, Echizen (JP); Michihiro Oida, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1051 days.

(21) Appl. No.: 16/592,240

(22) Filed: Oct. 3, 2019

(65) Prior Publication Data

US 2020/0111591 A1    Apr. 9, 2020

(30) Foreign Application Priority Data

Oct. 4, 2018   (JP) .................... 2018-189121

(51) Int. Cl.
  *H01F 1/053*    (2006.01)
  *H01F 1/057*    (2006.01)

(52) U.S. Cl.
  CPC ......... *H01F 1/0536* (2013.01); *H01F 1/0572* (2013.01); *H01F 1/0577* (2013.01)

(58) Field of Classification Search
  CPC .... H01F 1/0536; H01F 1/0572; H01F 1/0577; H01F 41/0293; H01F 41/026; H01F 1/15325; B22F 1/16; C22C 1/0441
  See application file for complete search history.

(56) References Cited

U.S. PATENT DOCUMENTS

| | | | |
|---|---|---|---|
| 8,206,516 B2 | 6/2012 | Yoshimura et al. |
| 8,211,327 B2 | 7/2012 | Nakamura et al. |

(Continued)

FOREIGN PATENT DOCUMENTS

| | | |
|---|---|---|
| EP | 2 169 689 A1 | 3/2010 |
| JP | 6-207203 A | 7/1994 |

(Continued)

OTHER PUBLICATIONS

Park et al., "Effect of Metal-Coating and Consecutive Heat Treatment on Coercivity of Thin Nd—Fe—B Sintered Magnets," Proceedings of the Sixteen International Workshop on Rare-Earth Magnets and Their Applications, The Japan Institute of Metals, 2000, p. 257-264, cited in Specification.

(Continued)

*Primary Examiner* — Brian D Walck
*Assistant Examiner* — Nazmun Nahar Shams
(74) *Attorney, Agent, or Firm* — WHDA, LLP

(57) ABSTRACT

Provided is a rare earth sintered magnet in which a multilayer main phase particle having multiple layers including a layer 1 having $R^2$ concentration, represented by at %, higher than that of a center of the particle, a layer 2 which is formed on the outside of the layer 1 and has $R^2$ concentration lower than that of the layer 1, and a layer 3 which is formed on the outside of the layer 2 and has $R^2$ concentration higher than that of the layer 2 is present at least in a portion in the vicinity of a surface of the main phase particle within at least 500 μm from a surface of the sintered magnet body.

10 Claims, 5 Drawing Sheets

(56) References Cited

U.S. PATENT DOCUMENTS

| | | |
|---|---|---|
| 8,257,511 B2 | 9/2012 | Nagata et al. |
| 8,377,233 B2 | 2/2013 | Nakamura et al. |
| 2008/0247898 A1 | 10/2008 | Nakamura et al. |
| 2009/0019969 A1* | 1/2009 | Kato .............. C22C 38/16 75/228 |
| 2009/0297699 A1 | 12/2009 | Baba et al. |
| 2010/0182113 A1 | 7/2010 | Yoshimura et al. |
| 2010/0297420 A1 | 11/2010 | Yoshizaki et al. |
| 2012/0114515 A1 | 5/2012 | Kaneko et al. |
| 2013/0087248 A1 | 4/2013 | Kuniyoshi |
| 2013/0271248 A1* | 10/2013 | Nagata .............. C22C 38/16 427/127 |
| 2014/0184370 A1 | 7/2014 | Hidaka et al. |
| 2014/0329007 A1 | 11/2014 | Obata |
| 2015/0155083 A1 | 6/2015 | Miwa et al. |

FOREIGN PATENT DOCUMENTS

| | | |
|---|---|---|
| JP | 2008-147634 A | 6/2008 |
| JP | 2008-263223 A | 10/2008 |
| JP | 2009-289994 A | 12/2009 |
| JP | 2011-82467 A | 4/2011 |
| WO | 2006/043348 A1 | 4/2006 |
| WO | 2008/023731 A1 | 2/2008 |
| WO | 2008/129784 A1 | 10/2008 |
| WO | 2009/004794 A1 | 1/2009 |
| WO | 2012/161355 A1 | 11/2012 |
| WO | 2013/122256 A1 | 8/2013 |

OTHER PUBLICATIONS

Suzuki et al., "Development and Their Applications of Rare Earth Magnets with Small and High Performance," Materials Integration, vol. 16, No. 7, 2003, p. 17-22, cited in Specification.

Machida et al., "Grain Boundary Modification and Magnetic Properties of Nd—Fe—B Sintered Magnets", Summary of Spring lecture of Japan Society of Powder and Powder Metallurgy, 2004, p. 202, cited in Specification.

Itoh et al., "Relationship between Grain Boundary Diffusion Dy amount and Coercivity of Nd—Fe—B Sintered Magnets," Summary of Spring lecture of the Japan Institute of Metals and Materials, 2007, p. 336, cited in Specification.

Machida et al., "Preparation and Characterization of High-Coercive Nd—Fe—B Sintered Magnets Sorbed by Metal Vapors" Summary of Academic lecture (32th) of the Magnetics Society of Japan, 2008, p. 375, cited in Specification.

Takada et al., "Effect of Dy diffusion Treatment on Coercivity of Nd—Fe—B magnet", Summary of Lecture of Japan Society of Powder and Powder Metallurgy, Spring Meeting, 2010, p. 92, cited in Specification.

Machida et al., "Coercivity Enhancement of Nd—Fe—B Sintered Magnet by Grain Boundary Modification Using Rare Earth Metal Fine Powder", Summary of Spring Meeting of the Japan Institute of Metals and Materials, 2009, p. 279, cited in Specification.

Kasada, et al., "Study on Microstructure of Neodymium Magnet Subjected to Dy Modification Treatment", Summary of Spring Meeting of the Japan Institute of Metals and Materials, 2009, p. 115, cited in Specification.

Extended (Supplementary) European Search Report dated Feb. 21, 2020, issued in counterpart EP Application No. 19198188.5. (5 pages).

Office Action dated Sep. 21, 2021, issued in counterpart JP application No. 2018-189121, with English Translation. (5 pages).

* cited by examiner

RARE EARTH SINTERED MAGNET

CROSS-REFERENCE TO RELATED APPLICATION

This non-provisional application claims priority under 35 U.S.C. § 119(a) on Patent Application No. 2018-189121 filed in Japan on Oct. 4, 2018, the entire contents of which are hereby incorporated by reference.

TECHNICAL FIELD

The present invention relates to a high-performance sintered rare earth magnet capable of reducing the amount of expensive Tb and Dy used.

BACKGROUND ART

An application range of a Nd—Fe—B sintered magnet continues to expand from hard disk drives to air conditioners, industrial motors, generators and drive motors for hybrid vehicles and electric vehicles, and the like. Since the magnets are exposed to high temperature in applications for air conditioner compressor motors and automotive applications, which are expected to be developed in the future, Dy and Tb are essentially added due to requirement of stability of properties under high temperature, that is, heat resistance; on the other hand, from the viewpoint of recent resource problems, how to reduce Dy and Tb has been an important issue.

In such a Nd—Fe—B magnet, it is considered that a small reverse magnetized region, called a reverse magnetic domain, is generated at an interface of $Nd_2Fe_{14}B$ crystal grains that are main components responsible for magnetism, and the magnetization is reversed by the growth of the reverse magnetic domain. Theoretically, the maximum coercivity is equal to the anisotropic magnetic field (6.4 MA/m) of a $Nd_2Fe_{14}B$ compound; however, due to an influence of a decrease in the anisotropic magnetic field caused by disorder of a crystal structure in the vicinity of a crystal grain boundary and a leakage magnetic field caused by structural morphology, the coercivity actually obtained is about 15% (1 MA/m) of the anisotropic magnetic field.

In such a Nd—Fe—B magnet, it is known that the anisotropic magnetic field becomes significantly higher than $Nd_2Fe_{14}B$ in a case where a site of Nd is substituted with Dy or Tb. Therefore, when a part of Nd is substituted with Dy or Tb, the anisotropic magnetic field is increased and thereby the coercivity is also enhanced. However, since Dy and Tb cause saturation magnetic polarization of a magnetic compound to be greatly reduced, a trade-off with the decrease in residual magnetic flux density is not avoidable as long as these elements are added to enhance the coercivity.

In consideration of such a magnetization reversal mechanism, if a part of Nd is substituted with Dy or Tb only in the vicinity of grain boundary in the main phase where the reverse magnetic domain is generated, even with a small amount of heavy rare earth, the coercivity can be enhanced and the decrease in the residual magnetic flux density can be suppressed. From this point of view, a manufacturing method called a two-alloy method has been developed in the related art (Patent Document 1). In this method, an alloy of a composition close to the $Nd_2Fe_{14}B$ compound and a sintering aid alloy to which Dy or Tb is added are separately prepared, crushed, and mixed, and then sintered. However, in this method, since the sintering temperature is as high as 1,050° C. to 1,100° C., Dy and Tb are diffused to the inside of about 1 to 4 μm from an interface of main phase crystal grains about 5 to 10 μm in diameter, and a concentration difference with a grain center is not large. In order to achieve higher coercivity and residual magnetic flux density, it is preferable to use a form in which heavy rare earths are concentrated at a high concentration in a thin diffusion region as possible, and for this, it is important to diffuse the heavy rare earths at lower temperature. The following grain boundary diffusion process has been developed to overcome this problem.

In a grain boundary diffusion process, once a sintered body is prepared, then Dy or Tb is supplied from a surface of the sintered body, a heavy rare earth is diffused into a magnet through a Nd-rich phase which is in a liquid phase at temperature lower than sintering temperature, and Nd is substituted with a heavy rare earth having high concentration only in the vicinity of the surface of the main phase crystal grain. Various technologies have been reported for the supply form of Dy or Tb as described below, and it is understood that the grain boundary diffusion process is highly positioned as a method of producing a high performance magnet.

(1) Dy/Tb metal film by sputtering (Non-Patent Documents 1 to 3)

(2) Application of non-metallic compound (fluoride/oxide and the like) powder (Patent Document 2)

(3) Application of fluoride and hydrogenated Ca causes the fluoride to be reduced and diffused to a heavy rare earth metal during a heat treatment (Non-patent Document 4)

(4) Dy vapor diffusion (Dy metal/alloy is introduced into a heat treatment box, and the Dy that has been in a vapor state during a diffusion treatment is diffused into a magnet) (Patent Documents 3 and 4 and Non-patent Documents 5 and 6)

(5) Application of metallic (simple substance, hydride, and alloy) powder (Patent Documents 5 and 6 and Non-patent Documents 7 and 8)

However, in all of the methods described above, there is a limit to the extent of a coercivity enhancing effect without significantly decreasing the residual magnetic flux density, for example, in a case of applying the method to a sintered body having a thickness of about 3 mm, the limit of enhanced coercivity increase is about 400 kA/m in Dy diffusion and about 700 kA/m in Tb diffusion.

On the other hand, various studies have been conducted on a base material (anisotropic sintered body before grain boundary diffusion) suitable for improving the enhancement of the coercivity by the grain boundary diffusion. For example, the present inventors have found that a high coercivity enhancing effect can be obtained by securing a diffusion path of Dy/Tb (Patent Document 7). In addition, from the viewpoint that a reaction of the diffused heavy rare earth with an oxide of Nd existing in the magnet causes the amount of diffusion to be reduced, it has also been proposed to reduce the reactivity with Dy/Tb and secure the amount of diffusion by adding fluorine to the base material in advance to convert the oxide into an oxyfluoride (Patent Document 8). However, the amount of increase in magnetic force is limited even with these methods, and a further enhancement of the coercivity has been desired.

CITATION LIST

Patent Document 1: JP-A H06-207203
Patent Document 2: WO 2006/043348
Patent Document 3: JP-A 2008-263223

Patent Document 4: WO 2008/023731
Patent Document 5: WO 2008/129784
Patent Document 6: JP-A 2009-289994
Patent Document 7: JP-A 2008-147634
Patent Document 8: JP-A 2011-82467

Non-patent document 1: K. T. Park, K. Hiraga and M. Sagawa, "Effect of Metal-Coating and Consecutive Heat Treatment on Coercivity of Thin Nd—Fe—B Sintered Magnets", Proceedings of the Sixteen International Workshop on Rare-Earth Magnets and Their Applications, Sendai, p. 257 (2000)

Non-patent document 2: S. Suzuki and K. Machida, "Development and Their Application of Rare Earth Magnets with Small and High Performance", Materials Integration, 16, (2003), 17-22

Non-patent document 3: K. Machida, T. Kawasaki, S. Suzuki, M. Itoh, T. Horikawa, "Grain Boundary Modification and Magnetic Properties of Nd—Fe—B Sintered Magnet", Summary of Spring lecture of Japan Society of Powder and Powder Metallurgy, p. 202 (2004)

Non-patent document 4: M. Itoh, K. Machida, S. Suzuki, D. S. Li, and H. Nishimoto, "Relationship between Grain Boundary Diffusion Dy amount and Coercivity of Nd—Fe—B Sintered Magnets", Summary of Spring lecture of The Japan Institute of Metals and Materials, p. 336 (2007)

Non-patent document 5: K. Machida, M. Zou, T. Horikawa, and D. S. Li, "Preparation and Characterization of High-Coercive Nd—Fe—B Sintered Magnets Sorbed by Metal Vapors" Summary of Academic lecture (32th) of The Magnetics Society of Japan, p. 375 (2008)

Non-patent document 6: Y. Takada, K. Fukumoto, and Y. Kaneko, "Effect of Dy diffusion Treatment on Coercivity of Nd—Fe—B magnet", Summary of Lecture of Japan Society of Powder and Powder Metallurgy, Spring Meeting, p. 92 (2010)

Non-patent document 7: K. Machida, H. Nishimoto, D. S. LI, T. Horikawa, and M. Itoh, "Coercivity Enhancement of Nd—Fe—B Sintered Magnet by Grain Boundary Modification Using Rare Earth Metal Fine Powder", Summary of Spring Meeting of The Japan Institute of Metals and Materials, p. 279 (2009)

Non-patent document 8: N. Ono, R. Kasada, H. Matsui, A. Kohyama, B. Imanari, T. Mizoguchi, and M. Sazawa, "Study on Microstructure of Neodymium Magnet Subjected to Dy Modification Treatment", Summary of Spring Meeting of The Japan Institute of Metals and Materials, p. 115 (2009)

SUMMARY OF THE INVENTION

The present invention has been made in view of the above-described conventional problems, and there is provided a R—Fe—B sintered magnet (R is at least one element selected from the rare earth element containing Sc and Y) with higher performance than those manufactured by conventional grain boundary diffusion technology.

As a result of intensive studies to achieve the above object, the present inventors have found that as a result of investigation of the relationship between various grain boundary diffusion patterns, coercivity enhancement effects, and metallographic structures, with respect to a R—Fe—B sintered magnet (R is at least one element selected from the rare earth element containing Sc and Y) represented by a Nd—Fe—B sintered magnet, as described below, a unique form of particles existing in the vicinity of the magnet surface can significantly increase the enhancement of the coercivity and reduce the amount of the expensive Tb and Dy used. Based on this finding, the present invention has been accomplished.

That is, the present invention provides a rare earth sintered magnet having the following particle morphology.

[1] A rare earth sintered magnet which is a sintered magnet body consisting essentially of $R^1{}_aR^2{}_bT_cM_dB_e$ composition ($R^1$ is at least one element selected from rare earth elements including Sc and Y, and except for Tb and Dy, $R^2$ is one or two elements selected from Tb and Dy, T is Fe or Fe and Co, M is at least one element selected from the group consisting of Al, Cu, Zn, In, Si, P, S, Ti, V, Cr, Mn, Ni, Ga, Ge, Zr, Nb, Mo, Pd, Ag, Cd, Sn, Sb, Hf, Ta, and W, B is boron, a to e satisfy, by at % of the alloy composition, $12 \leq a+b \leq 17$, $0.01 \leq d \leq 11$, and $3 \leq e \leq 15$, and the remainder is c), the magnet comprises a main phase particle having a $Nd_2Fe_{14}B$ tetragonal structure, wherein a multi-layer main phase particle having multiple layers including a layer 1 having $R^2$ concentration, represented by at %, higher than that of a center of the particle, a layer 2 which is formed on the outside of the layer 1 and has $R^2$ concentration lower than that of the layer 1, and a layer 3 which is formed on the outside of the layer 2 and has $R^2$ concentration higher than that of the layer 2 is present at least in a portion in the vicinity of a surface of the main phase particle within at least 500 μm from a surface of the sintered magnet body.

[2] The rare earth sintered magnet according to [1], wherein the multi-layer main phase particle is changed at a change rate of, by at %, 1%/nm or less in any case where the $R^2$ concentration is increased or decreased from the center of the particle to the layer 1, the layer 2, and the layer 3.

[3] The rare earth sintered magnet according to [1], wherein values obtained by subtracting an average $R^2$ concentration of the center of the particle from the respective $R^2$ concentrations of the layer 1, the layer 2, and the layer 3 included in the multi-layer main phase particle are set as, by at %, C1, C2, and C3, when a maximum value of C1 is set as $C1_{max}$, a minimum value of C2 is set as $C2_{min}$, a maximum value of C3 is set as $C3_{max}$, and a smaller value of $C1_{max}$ and $C3_{max}$ is set as $C_{max}$, $C1_{max}$ is 0.5% or more and 8% or less, $C2_{min}$ is 70% or less of $C_{max}$, and $C3_{max}$ is 0.5% or more and 8% or less, and C1, C2, and C3 satisfy $(C2_{min}+C_{max})/2 < C1 \leq C1_{max}$, $C2_{min} \leq C2 \leq (C2_{min}+C_{max})/2$, and $(C2_{min}+C_{max})/2 < C3 \leq C3_{max}$, respectively.

[4] The rare earth sintered magnet according to [1], wherein a thickness of each of the layers 1 to 3 is 0.02 to 1.5 μm.

[5] The rare earth sintered magnet according to [1], wherein in a particle which is adjacent to the multi-layer main phase particle via a crystal grain boundary phase, the multiple layers are not present in a region opposite to a region where the multiple layers of the multi-layer main phase particle are present.

[6] The rare earth sintered magnet according to [1], wherein an oxide particle including $R^1$ and $R^2$ having a shape without a corner is present in at least a part of a triple junction surrounded by three or more of the main phase particles, and at least a part of the oxide particle is a multi-layer oxide particle having multiple layers including a layer A having $R^2$ concentration, represented by at %, higher than that of a center of the particle, a layer B which is formed on the outside of the layer A and has $R^2$ concentration lower than that of the layer A, and a layer C which is formed on the outside of the layer B and has $R^2$ concentration higher than that of the layer B

[7] The rare earth sintered magnet according to [6], wherein the multi-layer oxide particle is changed at a change rate of, by at %, 1%/nm or less in any case where the $R^2$ concentration is increased or decreased from the center of the particle to the layer A, the layer B, and the layer C.

[8] The rare earth sintered magnet according to [6], wherein values obtained by subtracting an average $R^2$ concentration of the center of the particle from the respective $R^2$ concentrations of the layer A, the layer B, and the layer C included in the multi-layer oxide particle are set as, by at %, XA, XB, and XC, when a maximum value of XA is set as $XA_{max}$, a minimum value of XB is set as $XB_{min}$, a maximum value of XC is set as $XC_{max}$, and a smaller value of $XA_{max}$ and $XC_{max}$ is set as $X_{max}$, $XA_{max}$ is 1% or more and 20% or less, $XB_{min}$ is 70% or less of $X_{max}$, and $XC_{max}$ is 1% or more and 20% or less, and XA, XB, and XC satisfy $(XB_{min}+X_{max})/2 < XA \leq XA_{max}$, $XB_{min} \leq XB \leq (XB_{min}+X_{max})/2$, and $(XB_{min}+X_{max})/2 < XC \leq XC_{max}$, respectively.

[9] The rare earth sintered magnet according to [6], wherein a thickness of each of the layers A to C is 0.05 to 1 µm.

[10] The rare earth sintered magnet according to [6], wherein one or two or more elements selected from the group consisting of C, N, and F are contained in the oxide particle.

Advantageous Effects of the Invention

According to the present invention, it is possible to provide an R—Fe—B sintered magnet which has high performance and can reduce the amount of Tb or Dy used.

DESCRIPTION OF THE PREFERRED EMBODIMENT

Figure 1A:
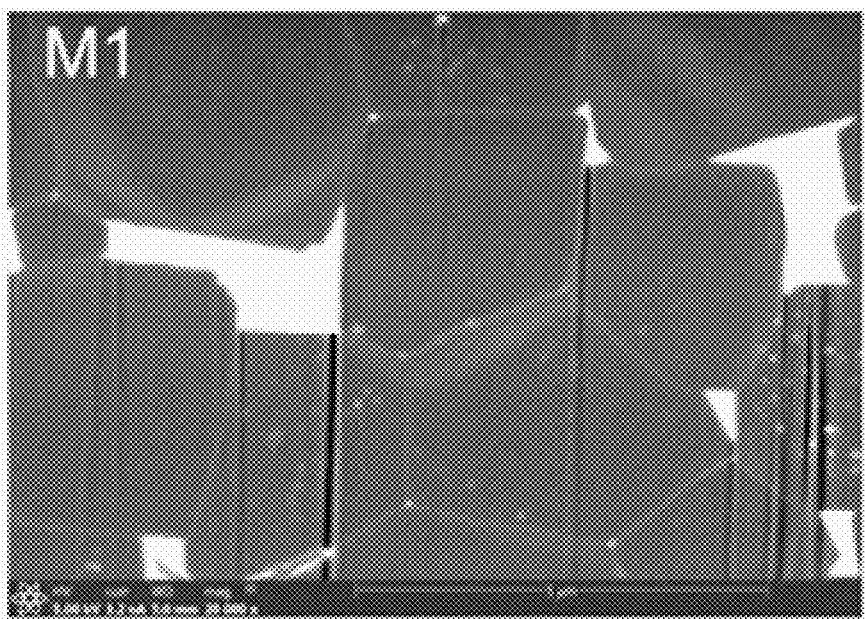
FIG. 1A and FIG. 1B are respectively scanning electron micrographs (reflected electron image) within 100 µm from a surface of a sintered magnet of Example 1 (M1) and Comparative Example 2 (C1)

Hereinafter, although the form for implementing the present invention is described, in the following description, in a case where there is no particular description about a symbol "R" indicating an element, the "R" represents at least one elements selected from rare earth elements including Sc and Y.

The rare earth sintered magnet of the present invention is, as described above, the sintered magnet body having the $R^1_a R^2_b T_c M_d B_e$ composition with the crystal phase having the $Nd_2Fe_{14}B$ tetragonal structure as a main phase, and includes a unique form of multi-layer main phase particle having the multiple layers as the particle present in the vicinity of the magnet surface as described in [1].

The sintered magnet body having such a unique form is can be obtained by diffusing $R^2$ ($R^2$ is one or two elements selected from Tb and Dy) to an R-T-B magnet body (R is at least one element selected from rare earth elements including Sc and Y, and T is Fe or Fe and Co). For example, the above sintered magnet body can be obtained by diffusing $R^2$ ($R^2$ is one or two elements selected from Tb and Dy) from a surface of an anisotropic sintered body consisting of the $R^1_a R^2_b T_c M_d B_e$ composition ($R^1$ is at least one element selected from rare earth elements including Sc and Y, and except for Tb and Dy, $R^2$ is one or two elements selected from Tb and Dy, T is Fe or Fe and Co, M is at least one element selected from the group consisting of Al, Cu, Zn, In, Si, P, S, Ti, V, Cr, Mn, Ni, Ga, Ge, Zr, Nb, Mo, Pd, Ag, Cd, Sn, Sb, Hf, Ta, and W, B is boron, a to e satisfy, by at % of the alloy composition, $12 \leq a+b \leq 17$, $0.01 \leq d \leq 11$, and $3 \leq e \leq 15$, and the remainder is c) having the $Nd_2Fe_{14}B$ crystal phase as the main phase.

The anisotropic sintered body having the $R^1_a R^2_b T_c M_d B_e$ composition can be obtained by roughly pulverizing, finely pulverizing, forming, and sintering a mother alloy according to a conventional method. In this case, the mother alloy contains R, T, M, and B. R is at least one element selected from rare earth elements including Sc and Y, and specific examples thereof include Sc, Y, La, Ce, Pr, Nd, Sm, Eu, Gd, Tb, Dy, Ho, Er, Yb, and Lu, and preferably, Nd, Pr, and Dy are mainly used. The rare earth elements containing Sc and Y are preferably 12 at % or more and less than 17 at %, and more preferably 13 to 15 at %, per entire alloy. Nd and/or Pr is preferably contained by 80 at % or more, and is more preferably contained by 85 at % or more per entire R. T is Fe, or Fe and Co, and Fe is preferably contained by 85 at % or more, and is more preferably contained by 90 at % or more per entire T, and T is preferably contained by 56 to 82 at %, and is particularly preferably contained by 67 to 81 at % per entire alloy. M is at least one element selected from the group consisting of Al, Cu, Zn, In, P, S, Ti, V, Cr, Mn, Ni, Ga, Ge, Zr, Nb, Mo, Pd, Ag, Cd, Sn, Sb, Hf, Ta, and W. M is preferably contained by 0.01 to 11 at %, and more preferably contained by 0.05 to 4 at %. B is boron and preferably contains 3 to 15 at %, and more preferably contains 5 to 7 at % pre the entire alloy. Note that C, N, O, and F may be contained in the sintered magnet as unavoidable impurities or intentional additive elements.

The mother alloy can be obtained by melting raw material metal or a raw material alloy in vacuum or in an inert gas, preferably in argon (Ar) atmosphere, and then casting the metal or alloy in a flat mold or a book mold, or casting the metal or alloy by strip casting. In addition, a so-called two-alloy method, in which an alloy having a composition close to the composition of the $R_2Fe_{14}B$ compound constituting the main phase of the alloy constituting the magnet of the present invention and an R-rich alloy serving as a liquid phase aid at sintering temperature are separately prepared and roughly mixed after coarse pulverizing, is also applicable to the present invention. However, as for the alloy having a composition close to the main phase composition, a-Fe tends to remain depending on the cooling rate at the time of casting and alloy composition, and a homogenization treatment is preferably performed as needed to increase the amount of $R_2Fe_{14}B$ compound phase. As the conditions, a heat treatment is preferably performed at 700° C. to 1,200° C. for one hour or more in vacuum or in an Ar atmosphere. In addition to the above-described casting method, so-called liquid quenching method and strip casting method can be applied to the R-rich alloy serving as a liquid phase aid.

Generally, the mother alloy is coarsely pulverized to be 0.05 to 3 mm, and particularly it is coarsely pulverized to be 0.05 to 1.5 mm. A brown mill or hydrogen pulverizing is used in a coarse pulverizing process, and in a case of an alloy prepared by strip casting, the hydrogen pulverizing is preferably used. Generally, the coarsely pulverized mother alloy powder is finely pulverized to be, for example, 0.1 to 30 μm by a jet mill using high pressure nitrogen, and particularly, it is finely pulverized to be 0.2 to 20 μm.

The obtained fine powder is formed into a predetermined shape by a compression forming machine in a magnetic field and charged into a sintering furnace. Generally, sintering is performed at 900° C. to 1,250, and particularly it is performed at 1,000° C. to 1,100° C. in vacuum or in an inert gas atmosphere. The obtained sintered magnet preferably contains a tetragonal $R_2Fe_{14}B$ compound as the main phase by 60% to 99% by volume, particularly 80% to 98% by volume, and the remainder consists of 0.5% to 20% by volume of R-rich phase, 0% to 10% by volume of B-rich phase, 0.1% to 10% by volume of at least one type of an oxide of R, a carbide, a nitride, a hydroxide, and a fluoride of R produced by unavoidable impurities, or a mixture or a composite thereof.

The obtained sintered magnet block is ground to a predetermined shape as needed, and then subjected to a grain boundary diffusion process described in detail below. The size is not particularly limited, but in the grain boundary diffusion process, $R^2$ absorbed by the magnet body becomes larger as the specific surface area of the magnet body is larger, that is, the smaller the dimension is, the more $R^2$ is, and thus in a case where the coercivity is enhanced as the entire magnet, the dimension of the largest part of the shape of the sintered magnet is preferably 100 mm or less and is particularly 50 mm or less, and the dimension in the direction in which the magnetic anisotropy is made is preferably 30 mm or less and is particularly 15 mm or less. Note that, the lower limits of the dimension of the largest part of the sintered magnet and the dimension in the direction in which the magnetic anisotropy is made are appropriately selected without being particularly limited. In particular, the dimension of the largest part of the shape of the sintered magnet is preferably 1 mm or more, and the dimension in the direction in which the magnetic anisotropy is made is preferably 0.5 mm or more. In addition, in order to enhance the coercivity of only a specific portion such as a surface layer portion or a corner portion of the magnet, the size of the sintered magnet block to be provided is not limited.

By diffusing the above $R^2$ from the surface of the sintered magnet (anisotropic sintered body) obtained in this manner, it is possible to form the unique particle morphology in the vicinity of the surface of the magnet body.

In this grain boundary diffusion process, $R^2$, typically Dy and/or Tb, or a substance containing these is present on the surface of the sintered magnet, and a heat treatment for diffusion is performed. A known method can be adopted as a method of causing Dy and/or Tb, or the substance containing these to be present. Here, in the present invention, for example, the unique particle morphology can be formed by performing this diffusion treatment plural times, furthermore, it is preferable that a process of applying substance containing rare earth $R^3$ other than Dy or Tb on the magnet surface and performing the heat treatment for diffusion is introduced in the middle of the plural times of diffusion treatments. That is, typically, Dy and/or Tb element is diffused, then the rare earth $R^3$ element other than Dy or Tb is diffused, and then the Dy and/or Tb element is further diffused. Here, $R^3$ is a rare earth element other than Dy and Tb which is taken into the magnet by the diffusion treatment, it becomes a part of $R^1$ after being taken into the magnet. With such a treatment, it is possible to obtain the above-described unique particle morphology in which the multi-layer main phase particle having multiple layers including the layer 1, the layer 2, and the layer 3 present in the vicinity of the surface of the magnet body, and a high coercivity that is difficult to achieve with the diffusion treatment in the related art can be obtained. The method of obtaining the multi-layer main phase particle having the multiple layers is not limited to the method of performing the three times of diffusion treatment, and the number of times of diffusion, diffusion elements, and diffusion conditions and the like which are described below can be changed as appropriate, and therefore, any method and condition can be adopted as long as the multi-layer main phase particle having the multiple layers is formed as a result.

Regarding the multi-layer main phase particles, as a metallurgically remarkable feature, a plurality of layers differing only in the concentration of the rare earth in the compound are present in at least a part of the main phase crystal grains particularly in the vicinity of the magnet surface, and the plurality of layers are multiple layers including at least three layers of a layer 1 having $R^2$ concentration, represented by at %, higher than that of the center of the crystal grain, a layer 2 which is formed on the outside of the layer 1 and has $R^2$ concentration lower than that of the layer 1, and a layer 3 which is formed on the outside of the layer 2 and has $R^2$ concentration higher than that of the layer 2. In this case, a change of the concentration of these layers 1 to 3 is not particularly limited, and for example, in any case where the $R^2$ concentration is increased or decreased from the center of the particle to the layer 1, the layer 2, and the layer 3, the concentration is preferably changed at a change rate of, by at %, 1%/nm or less and is more preferably changed at a change rate of 0.5%/nm or less. Note that, in each layer, a portion having a change rate of 0%/nm may be included.

A thickness of each of the layers 1 to 3 is not particularly limited, and is preferably 0.02 to 1.5 μm, and is more preferably 0.05 to 1 μm. More specifically, the thickness is preferably 0.1 to 1 μm for the layer 1, 0.05 to 0.5 μm for the layer 2, and 0.05 to 0.5 μm for the layer 3.

Further, the concentration difference of the $R^2$ concentration between the respective layers is not particularly limited, but it is preferable to set the concentration difference satisfying the following conditions. That is, it is preferable that the values obtained by subtracting an average $R^2$ concentration of the center of the particle from the respective $R^2$ concentrations of the layer 1, the layer 2, and the layer 3 included in the multi-layer main phase particle are set as, by at %, C1, C2, and C3, when a maximum value of C1 is set as $C1_{max}$, a minimum value of C2 is set as $C2_{min}$, a maximum value of C3 is set as $C3_{max}$, and a smaller value of $C1_{max}$ and $C3_{max}$ is set as $C_{max}$, $C1_{max}$ is 0.5% or more and 8% or less, $C2_{min}$ is 70% or less of $C_{max}$, and $C3_{max}$ is 0.5% or more and 8% or less, and C1, C2, and C3 satisfy $(C2_{min}+C_{max})/2<C1\leq C1_{max}$, $C2_{min}\leq C2\leq (C2_{min}+C_{max})/2$, and $(C2_{min}+C_{max})/2<C3\leq C3_{max}$, respectively. Note that, the layer 1 and layer 3 may have the same $R^2$ concentration, or either may have the higher $R^2$ concentration.

Here, in a case where the two-alloy method is applied at the time of preparation of the base material, the main phase particle has a core-shell structure unique to the two-alloy method. From the viewpoint of differing only in the rare earth concentration in the compound, the core and shell in this case are similar to the layers 1 to 3 described above; however, unlike the grain boundary diffusion process, since $R^2$ is diffused at the sintering temperature higher than the diffusion treatment temperature, the thickness of the shell is generally 0.5 to 1 μm or more, which is thicker than the above layers, and the concentration difference is also lower than the above layers, and thus it can be easily distinguished that the form of the core and shell is different from those of the above layers based on a reflected electron image in the scanning electron microscope or a composition image by EDS. That is, the triple layers include three layers of a layer 1 having $R^2$ concentration on the outside of a shell portion where the $R^2$ concentration is slightly higher than that of the center of the crystal grain, a layer 2 has $R^2$ concentration lower than that of the layer 1, and a layer 3 which has $R^2$ concentration higher than that of the layer 2.

Note that, a $Nd_2Fe_{14}B$ crystal phase which is the main phase particle of the magnet of the present invention is a particle having a tetragonal crystal structure, and an average grain size thereof is preferably 2 to 15 μm, and is more preferably 2.2 to 8 μm. If the average grain size of the main phase particle is less than 2 μm, the orientation may be easily disturbed and the residual magnetic flux density may be lowered; on the other hand, if it exceeds 15 μm, the coercivity may be weakened. In addition, among the main phase particles, the multi-layer main phase particle having the above-described multiple layers may be present at least within 500 μm from the surface of the sintered magnet body.

Furthermore, in the rare earth sintered magnet of the present invention, within at least 500 μm from the surface of the sintered magnet body, at least a part of the oxide particle, which includes $R^1$ and $R^2$ ($R^1$ and $R^2$ are the same as above) in a shape without a corner and is present in the triple junction surrounded by three or more of the main phase particles, is preferably a multi-layer oxide particle having multiple layers including a layer A having $R^2$ concentration, represented by at %, higher than that of a center of the particle, a layer B which is formed on the outside of the layer A and has $R^2$ concentration lower than that of the layer A, and a layer C which is formed on the outside of the layer B and has $R^2$ concentration higher than that of the layer B. The multi-layer oxide particle having such a structure of the multiple layers can be formed by plural times of the diffusion treatments. Note that, also in the layers A to C, as in the case of the multi-layer main phase particle, the concentration is preferably changed at a change rate of, by at %, 1%/nm or less and is more preferably changed at a change rate of 0.5%/nm or less in any case where the $R^2$ concentration is increased or decreased. Note that, in each layer, a portion having a change rate of 0%/nm may be included.

A thickness of each of the layers A to C is not particularly limited, and is preferably 0.05 to 1 μm, and is more preferably 0.1 to 0.8 μm. More specifically, the thickness is preferably 0.1 to 0.5 μm for the layer A, 0.1 to 0.8 μm for the layer B, and 0.1 to 0.5 μm for the layer C.

Further, the concentration difference of the $R^2$ concentration between the respective layers is not particularly limited, but it is preferable to set the concentration difference satisfying the following conditions. That is, it is preferable that the values obtained by subtracting an average $R^2$ concentration of the center of the particle from the respective $R^2$ concentrations of the layer A, the layer B, and the layer C included in the multi-layer oxide particle are set as, by at %, XA, XB, and XC, when a maximum value of XA is set as $XA_{max}$, a minimum value of XB is set as $XB_{min}$, a maximum value of XC is set as $XC_{max}$, and a smaller value of $XA_{max}$ and $XC_{max}$ is set as $X_{max}$, $XA_{max}$ is 1% or more and 20% or less, $XB_{min}$ is 70% or less of $X_{max}$, and $XC_{max}$ is 1% or more and 20% or less, and XA, XB, and XC satisfy $(XB_{min}+X_{max})/2<XA\leq XA_{max}$, $XB_{min}\leq XB\leq (XB_{min}+X_{max})/2$, and $(XB_{min}+X_{max})/2<XC\leq XC_{max}$, respectively. Note that, the layer A and layer C may have the same $R^2$ concentration, or either may have the higher $R^2$ concentration.

Although it is not clear why such a sintered magnet having the multiple layers in the main phase particle and the multiple layers in the oxide particle exhibit higher coercivity than that of the grain boundary diffusion magnet in the conventional art, it is inferred that in the magnet body having such a structural morphology, the $R^2$ concentration on the surface of the main phase particle is higher than the $R^2$ concentration by the diffusion treatment in the related art.

As described above, the grain boundary diffusion treatment is to cause the above $R^2$, $R^3$ or a substance containing these to be present on the surface of the sintered magnet and to perform a heat treatment thereon, and in this case, as a method of causing $R^2$, $R^3$ or a substance (diffusion material) containing these to be present on the surface of the sintered magnet, a method of making the diffusion material powdered and coating the magnet body surface with the powdered diffusion material, a method of coating the magnet body surface with the diffusion material by PVD or CVD, and a method of vaporizing the diffusion material to bring the diffusion material into contact with the magnet body surface, and etc. can be adopted. More specifically, a method of coating the magnet body surface with powders of compounds such as an oxide, a fluoride, an oxyfluoride, a hydride, a hydroxide of $R^2$ or $R^3$, a powder of $R^2$ or $R^3$, an alloy powder containing $R^2$ or $R^3$, a sputtered film or a deposited film of $R^2$ or $R^3$, or a sputtered film or a deposited film of an alloy containing $R^2$ or $R^3$, and a method of mixing and attaching a fluoride of $R^2$ or $R^3$ and a reducing agent such as calcium hydride can be exemplified, and any method can be applied. In addition, a method of vaporizing and then attaching Dy and Sm to the magnet body by performing the heat treatment on Dy and Sm with high temperature and high saturated to vapor pressure or their alloys under reduced pressure (hereinafter, referred to as vapor diffusion) can be also suitably adopted.

In the above diffusion treatment, since Dy and Tb greatly contribute to the effect of concentrating on a crystal grain surface layer portion to enhance the crystal magnetic anisotropy, the proportion of Dy and/or Tb in the total rare earth components in the diffusion material in the first or final diffusion treatment is preferably 50 at % or more, more preferably 70 at % or more, and still more preferably 90 at % or more. Also, the proportion of Nd and/or Pr in the total rare earth component in the diffusion material is preferably lower than the proportion of Nd and/or Pr in the total rare earth component contained in the anisotropic sintered body which is a base anisotropic sintered body. On the other hand, regarding the diffusion material in the middle of repeated diffusion treatment, the content of Nd and/or Pr is preferably 50 at % or more, more preferably 70 at % or more, and still more preferably 90 at % or more. The amount of Dy or Tb taken into the magnet by the diffusion treatment is about 0.01% to 1 at %.

Here, in the $R^1{}_aR^2{}_bT_cM_dB_e$ composition of the rare earth sintered magnet of the present invention, all of the $R^2$ which are one or two elements selected from Dy and Tb may be taken into the magnet by the diffusion treatment, or $R^2$ is contained in the mother alloy and Dy, Tb, or both taken by the diffusion treatment may constitute a part of $R^2$. For example, the present invention includes an aspect that by diffusing Tb as $R^2$ into the mother alloy free of at least Tb, the Tb introduced by the diffusion constitutes at least a part or the entire of $R^2$ in the $R^1{}_aR^2{}_bT_cM_dB_e$ composition of the rare earth sintered magnet, and an aspect that by diffusing Dy as $R^2$ into the mother alloy free of at least Dy, the Dy introduced by the diffusion constitutes at least a part or the entire of $R^2$ in the $R^1{}_aR^2{}_bT_cM_dB_e$ composition of the rare earth sintered magnet.

In the case of performing the heat treatment by causing the diffusion material to be present on the surface of the magnet body, the magnet body is heat-treated in vacuum or in an inert gas atmosphere such as argon or helium by a method other than vapor diffusion. Further, in the vapor diffusion, a predetermined pressure is set to control the amount of vapor as a diffusion source. The diffusion treatment temperature is set to be lower than the sintering temperature of the magnet body. That is, if the treatment is performed at a temperature higher than the sintering temperature (hereinafter, referred to as $T_S°$ C.) of the sintered magnet, (1) the structure of the sintered magnet is degenerated and thereby the high magnetic properties cannot be obtained, (2) the process dimension cannot be maintained due to thermal deformation, and (3) the diffused R is diffused not only to the crystal grain boundary of the magnet but also to the inside thereof, causing problems such as a decrease in residual magnetic flux density. Therefore, the treatment temperature is set to be equal to or lower than the sintering temperature or preferably set to be $(T_S-10)°$ C. The lower limit of the temperature is selected as appropriate, and is generally 600° C. or higher. The time for an absorption treatment is 1 minute to 100 hours. If it is shorter than 1 minute, the absorption treatment is not completed, and if it exceeds 100 hours, problems that the magnetic properties are adversely affected by unavoidable oxidation and evaporation of components and/or the structure of the sintered magnet is degenerate are likely to occur. The time for the absorption treatment is more preferably 30 minutes to 50 hours, and particularly 1 hour to 30 hours.

As described above, it is preferable to repeat the diffusion treatment plural times so as to obtain the sintered magnet body of the present invention, but it is also effective to change not only the diffusion element kinds but also the heat treatment conditions at that time. Specifically, for example, each time the diffusion treatment is repeated, the treatment temperature is set to be low and the treatment time is set to be long, so that the magnet of the present invention can be manufactured more efficiently.

With such a diffusion treatment, Dy and/or Tb is enriched in a Nd-rich grain boundary phase component in the magnet, this Dy and/or Tb is substituted in the vicinity of a surface layer portion of $R_2Fe_{14}B$ main phase particle, the multiple layers described above are formed on at least a part of the main phase particle, and thereby the multi-layer main phase particle having the above-described multiple layers can be present within the range of at least 500 μm, preferably within the range of 800 μm from the surface of the sintered magnet. As a result, since the coercivity of the R—Fe—B sintered magnet can be efficiently enhanced with almost no reduction in the residual magnetic flux density, and the magnetic performance can be efficiently improved, the amount of Tb and/or Dy used can also be reduced.

Although the rare earth sintered magnet of the present invention is not particularly limited, it is preferable to perform the heat treatment at a low temperature (hereinafter, this treatment is referred to as an aging treatment) after the diffusion treatment. The treatment temperature of this ageing treatment is lower than the treatment temperature of the diffusion treatment, preferably 200° C. or higher and equal to or lower than the temperature which is lower than the diffusion treatment temperature by 10° C., and more preferably 350° C. or higher and equal to or lower than the temperature which is lower than the diffusion treatment temperature by 10° C. The atmosphere is preferably in vacuum or in an inert gas such as Ar or He. The time for the ageing treatment is 1 minute to 10 hours, preferably 10 minutes to 5 hours, and more preferably 30 minutes to 2 hours.

Note that, in a case of using a water-based coolant as a coolant for a grinding machine at the time of the above-described grinding process before the diffusion treatment or in a case where the grinding surface is exposed to high temperature during the processing, an oxide film is likely to be formed on the surface to be ground, and this oxide film may interfere with the absorption reaction of Dy/Tb to the magnet body. In such a case, appropriate absorption treatment can be performed by cleaning with one or more types of alkali, acid, and an organic solvent, or by shot blasting to remove the oxide film. Examples of alkali include potassium pyrophosphate, sodium pyrophosphate, potassium citrate, sodium citrate, potassium acetate, sodium acetate, potassium oxalate, and sodium oxalate, examples of acid include hydrochloric acid, nitric acid, sulfuric acid, acetic acid, citric acid, and tartaric acid, and examples of an organic solvent include acetone, methanol, ethanol, and isopropyl alcohol. In this case, the above-described alkali or acid can be used as an aqueous solution of an appropriate concentration which does not corrode the magnet body.

In addition, the magnet subjected to the diffusion treatment or the subsequent ageing treatment may be washed with one or more types of alkali, acid, and an organic solvent, or may be ground to a practical shape. Furthermore, plating or coating can be performed after such diffusion treatment, ageing treatment, cleaning, or grinding.

A permanent magnet material obtained as described above can be used as a high performance permanent magnet with enhanced coercivity.

EXAMPLES

Hereinafter, the present invention is more specifically described by way of Examples and Comparative Example, but the present invention is not limited thereto.

Example 1 and Comparative Examples 1 and 2

A thin alloy sheet consisting of 14.5 at % of Nd, 2.0 at % of Co, 0.5 at % of Al, 0.2 at % of Cu, 6.1 at % of B, and the balance of Fe was obtained by a strip casting method in which Nd, Co, Al, Fe, and Cu metal with a purity of 99% by weight or more and ferroboron were melted at a high frequency in an Ar atmosphere, and the molten metal was poured into a single copper roll. After exposing this alloy to 0.11 MPa of hydrogen at room temperature to occlude hydrogen, and then heated to 500° C. to partially release hydrogen while evacuating, cooled, and sieved to make a coarse powder having 50 mesh or less.

Subsequently, the above coarse powder was finely pulverized to a mass median particle diameter of 3.5 μm by a jet mill using a high pressure nitrogen gas. The obtained fine powder was formed into a block at a pressure of about 100 MPa while being oriented in a magnetic field of 1.2 MA/m under a nitrogen atmosphere. Next, the formed body was put into a sintering furnace in an Ar atmosphere, and sintered at 1,060° C. for 2 hours to prepare a sintered magnet block. This sintered magnet block was ground with a diamond cutter to a dimension of 10×10×3 mm in thickness (direction of orientation), then washed with an alkaline solution, pure water, nitric acid, and pure water in this order, and dried so as to obtain a sintered magnet body.

Next, the above-described sintered magnet body was immersed for 30 seconds into a suspension in which a terbium fluoride powder was mixed with ethanol at a weight fraction of 50% while applying ultrasonic waves. The average particle diameter of the terbium fluoride powder was 5 μm. The magnet body pulled up from the suspension was put into a vacuum desiccator and dried at room temperature under an exhaust atmosphere by a rotary pump for 30 minutes. Thereafter, the magnet body covered with terbium fluoride was subjected to the first diffusion treatment under the condition of 900° C. for 3 hours in an Ar atmosphere.

The magnet taken out of the furnace was immersed for 30 seconds into a suspension in which a neodymium fluoride powder was mixed with ethanol at a weight fraction of 50% while applying ultrasonic waves. The average particle diameter of the neodymium fluoride powder was 3 μm. The magnet pulled up from the suspension was put into a vacuum desiccator and dried at room temperature under an exhaust atmosphere by a rotary pump for 30 minutes. Thereafter, the magnet body covered with neodymium fluoride was subjected to the second diffusion treatment under the condition of 850° C. for 5 hours in an Ar atmosphere.

Furthermore, the magnet taken out of the furnace was immersed for 30 seconds into a suspension of terbium fluoride powder and ethanol used in the first diffusion treatment while applying ultrasonic waves. The magnet pulled up from the suspension was put into a vacuum desiccator and dried at room temperature under an exhaust atmosphere by a rotary pump for 30 minutes. Thereafter, the magnet body covered with terbium fluoride was subjected to the third diffusion treatment under the condition of 800° C. for 15 hours in an Ar atmosphere.

The magnet body subjected to the diffusion treatment three times was further subjected to an ageing treatment in which a heat treatment was performed at 500° C. for 1 hour in vacuum and quenched, so as to obtain a sintered magnet body of the present invention. This sintered magnet body is set as a magnet body M1 (Example 1). For comparison, a magnet body P1 (Comparative Example 1) which was subjected to only the ageing treatment without the diffusion treatment, and a magnet body C1 (Comparative Example 2) which was subjected to only the first diffusion treatment and the ageing treatment were also prepared.

Figure 1B:
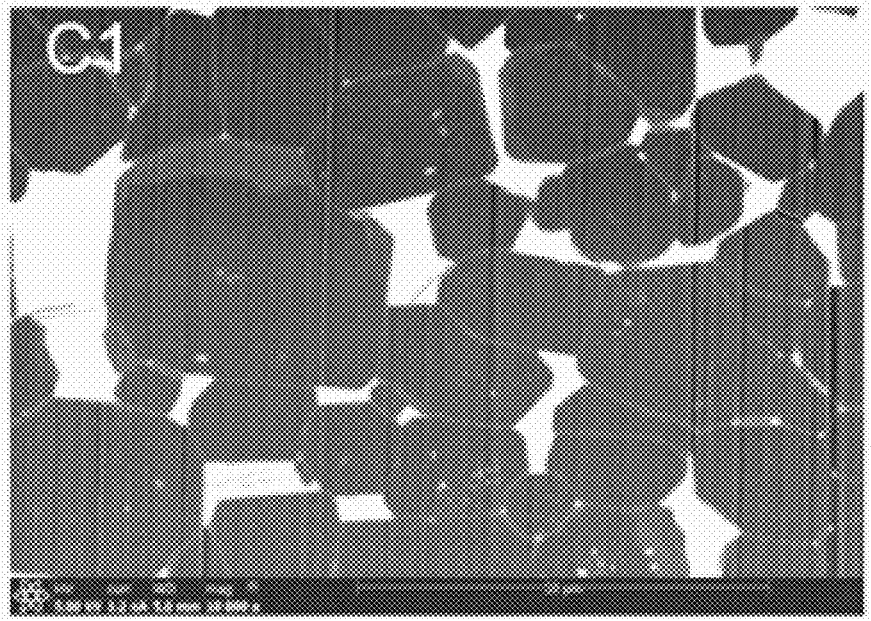
Figure 2A:
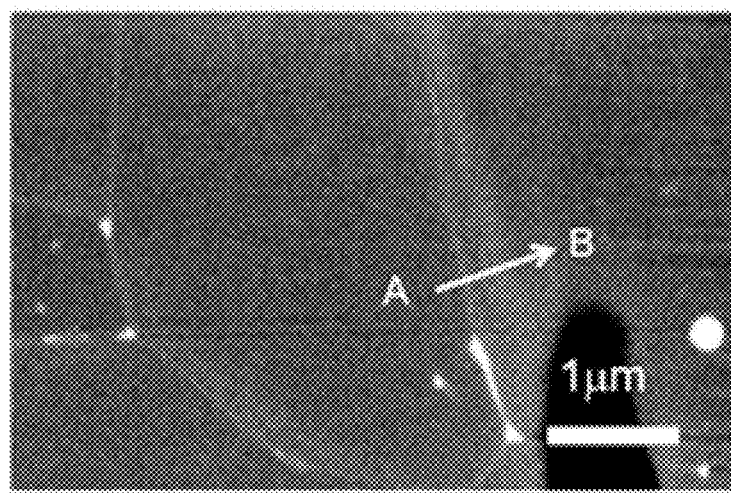
FIG. 2A is a scanning electron micrograph (reflected electron image) within 100 µm from the surface of the magnet of Example 1 (M1)
Figure 2B:
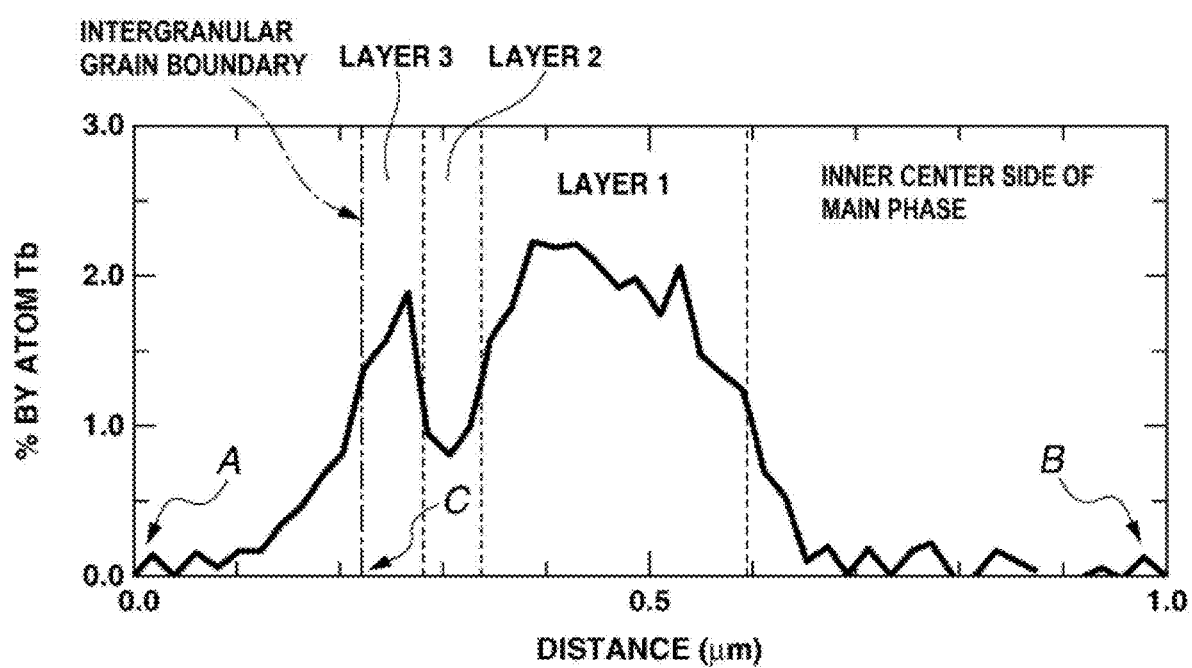
FIG. 2B is a graph illustrating a concentration profile of Tb at a line segment AB marked in FIG. 2A.

FIGS. 1A and 1B illustrate a scanning electron micrograph (reflected electron image) within 100 μm from the surface of the magnet bodies of M1 and C1. In M1 and C1 subjected to the grain boundary diffusion treatment, a layer bright in contrast is observed in the vicinity of the outer shell in some crystal grains. This is because a part of R is substituted with Tb in a part of the surface layer portion of a $R_2Fe_{14}B$ crystal grain. Regarding the magnet body M1, FIGS. 2A and 2B illustrate a scanning electron micrograph of a field of view different from that of FIG. 1A and a concentration profile of Tb at a line segment AB marked in the photograph. Note that, TEM-EDS is used to measure a Tb concentration profile, and a sample piece at that time is rotated so that a sample piece thickness direction of an interface at a intergranular grain boundary is parallel to an irradiation direction of an electron beam. As illustrated in FIGS. 2A and 2B, in M1, Tb is not present at the inner center side of the main phase particle, toward the outer shell, a layer having high Tb concentration, a layer having lower Tb concentration than that, and a layer having high Tb concentration again on the outermost side are recognized. Assuming that a point of intersection with the intergranular grain boundary on the line segment AB is set as C, the Tb concentration profile in the particle on the right side (B side) of the photograph including the line segment BC corresponds to the multiple (in this Example, triple) layers in the present invention. That is, there is a region where the Tb concentration is high from the grain boundary side, and then there is a region where the Tb concentration is low in the form of a minimum. A region with high Tb concentration can be observed inside the region in a form of maximum. As the concentration profile illustrated in FIG. 2B, in these triple layers, the Tb concentration is changed at a change rate of, by at %, 1%/nm or less in any case where the Tb concentration is increased or decreased.

On the other hand, a concentration profile of a particle on the left side (A side) of the photograph containing line segment AC is decreased monotonously from the particle surface as illustrated in FIG. 2B, and is a common concentration profile often observed in the magnet body of after the grain boundary diffusion treatment in the related art. As illustrated in FIGS. 2A and 2B, in the magnet according to the present invention, an aspect that the triple layers are present in a region of another particle facing the region where the above-described triple layers are observed via the grain boundary between the two particles is not observed.

Figure 3A:
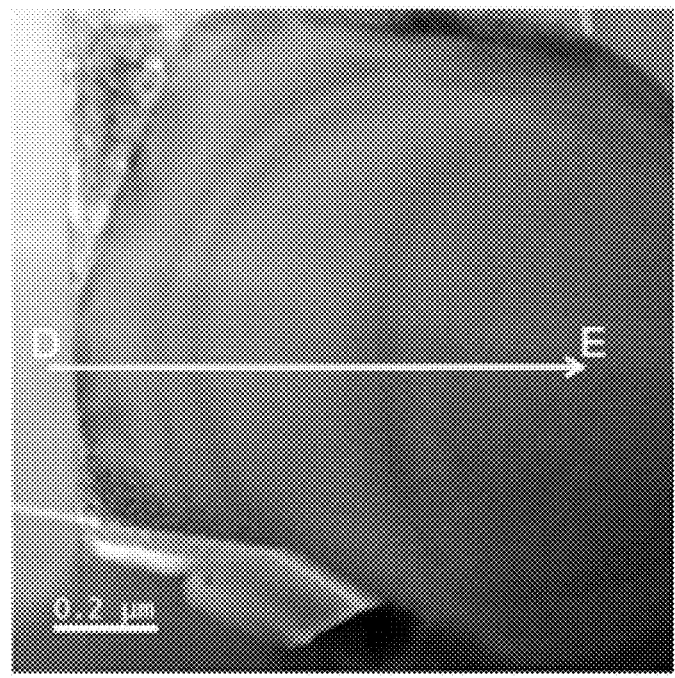
FIG. 3A is a transmission electron micrograph illustrating an oxide particle within 300 µm from the surface of the magnet body of Example 1 (M1)
Figure 3B:
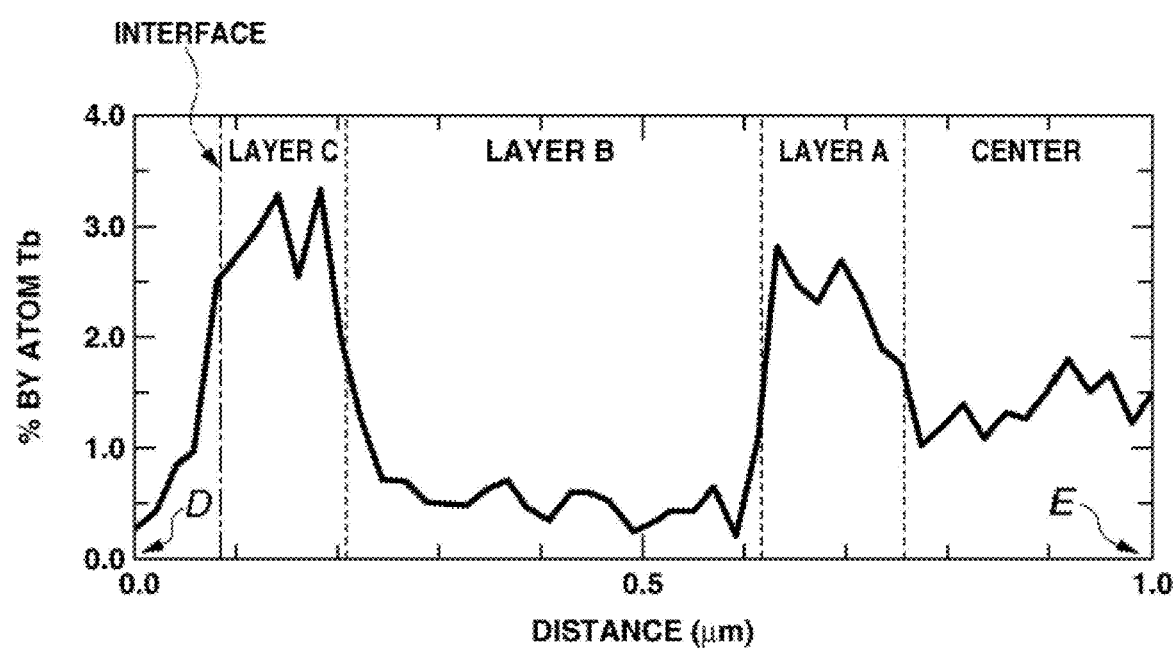
FIG. 3B is a graph illustrating a concentration profile of Tb at a line segment DE in FIG. 3A.

Furthermore, if the oxide phase at the triple junction of the magnet body M1 was observed, as illustrated in FIGS. 3A and 3B, a unique concentration profile not observed at all in the magnet in the related art or the grain boundary diffusion treated magnet in the related art was recognized. FIGS. 3A and 3B illustrate a transmission electron micrograph (FIG. 3A) of the oxide particle and the Tb concentration profile at the line segment DE in the photograph (FIG. 3B) observed within 300 μm from the surface of the magnet body. As illustrated in FIG. 3A, the oxide phase present at the triple junction inside the M1 magnet exhibits a smooth shape without corners, and the presence of multiple (in this Example, triple) layers consisting of, toward the outer shell from the center, a layer A having a high Tb concentration, a layer B having a lower Tb concentration than that of the layer A, and a layer C having a high Tb concentration again on the outermost side is recognized. As the concentration profile illustrated in FIG. 3B, in these triple layers A to C, the Tb concentration is changed at a change rate of, by at %, 1%/nm or less in any case where the Tb concentration is increased or decreased.

In addition, the magnetic properties (coercivity, residual magnetic flux density, and (BH) max) of the above-described magnet bodies M1, P1, and C1 were measured. The results are indicated in Table 1. As indicated in Table 1, compared with the coercivity of the magnet (P1) which is not subjected to the diffusion treatment, an enhancement in the coercivity of 950 kAm$^{-1}$ for the magnet M1 according to the present invention is recognized. In addition, the decrease in the residual magnetic flux density was 5 mT and there was almost no decrease of (BH) max. It is understood that the coercivity enhancing effect of the diffusion treated magnet C1 in the related art is 750 kAm$^{-1}$, which does not reach the amount of the coercivity enhanced in the present invention.

Example 2 and Comparative Examples 3 and 4

A thin alloy sheet consisting of 13.5 at % of Nd, 1.0 at % of Dy, 3.0 at % of Co, 0.5 at % of Al, 0.2 at % of Cu, 0.1 at % of Zr, 6.0 at % of B, and the balance of Fe was obtained by a strip casting method in which Nd, Dy, Co, Al, Fe, Cu, and Zr metal with a purity of 99% by weight or more and ferroboron were melted at a high frequency in an Ar atmosphere, and the molten metal was poured into a single copper roll. After exposing this alloy to 0.11 MPa of hydrogen at room temperature to occlude hydrogen, and then heated to 500° C. to partially release hydrogen while evacuating, cooled, and sieved to make a coarse powder having 50 mesh or less.

Subsequently, the above coarse powder was finely pulverized to a mass median particle diameter of 3.0 μm by a jet mill using a high pressure nitrogen gas. The obtained fine powder was formed into a block at a pressure of about 100 MPa while being oriented in a magnetic field of 1.2 MA/m under a nitrogen atmosphere. Next, the formed body was put into a sintering furnace in an Ar atmosphere, and sintered at 1,040° C. for 2 hours to prepare a sintered magnet block. This sintered magnet block was ground with a diamond cutter to a dimension of 12×12×5 mm in thickness (direction of orientation), then washed with an alkaline solution, pure water, nitric acid, and pure water in this order, and dried so as to obtain a sintered magnet body.

Next, the above-described sintered magnet body was immersed for 30 seconds into a suspension in which a terbium oxide powder was mixed with ethanol at a weight fraction of 50% while applying ultrasonic waves. The average particle diameter of the terbium oxide powder was 0.3 μm. The magnet body pulled up from the suspension was dried for about 1 minute by hot air of a drier. Thereafter, the magnet body covered with terbium oxide was subjected to the first diffusion treatment under the condition of 920° C. for 10 hours in an Ar atmosphere.

The magnet taken out of the furnace was immersed for 30 seconds into a suspension in which a neodymium fluoride powder was mixed with ethanol at a weight fraction of 50% while applying ultrasonic waves. The average particle diameter of the neodymium fluoride powder was 3 μm. The magnet pulled up from the suspension was dried for about 1 minute by hot air of a drier. Thereafter, the magnet body covered with neodymium fluoride was subjected to the second diffusion treatment under the condition of 850° C. for 10 hours in an Ar atmosphere.

Further, the magnet taken out of the furnace was immersed for 30 seconds into a suspension in which a terbium fluoride powder was mixed with ethanol at a weight fraction of 50% while applying ultrasonic waves. The average particle diameter of the terbium fluoride powder was 5 μm. The magnet pulled up from the suspension was dried for about 1 minute by hot air of a drier. Thereafter, the magnet body covered with terbium fluoride was subjected to the third diffusion treatment under the condition of 800° C. for 20 hours in an Ar atmosphere.

The magnet body subjected to the diffusion treatment three times was further subjected to an ageing treatment in which a heat treatment was performed at 500° C. for 1 hour in vacuum and quenched, so as to obtain a sintered magnet body of the present invention. This sintered magnet body is set as a magnet body M2 (Example 2). For comparison, a magnet body P2 (Comparative Example 3) which was subjected to only the ageing treatment without the diffusion treatment, and a magnet body C2 (Comparative Example 4) which was subjected to only the first diffusion treatment and the ageing treatment were also prepared.

Figure 4A:
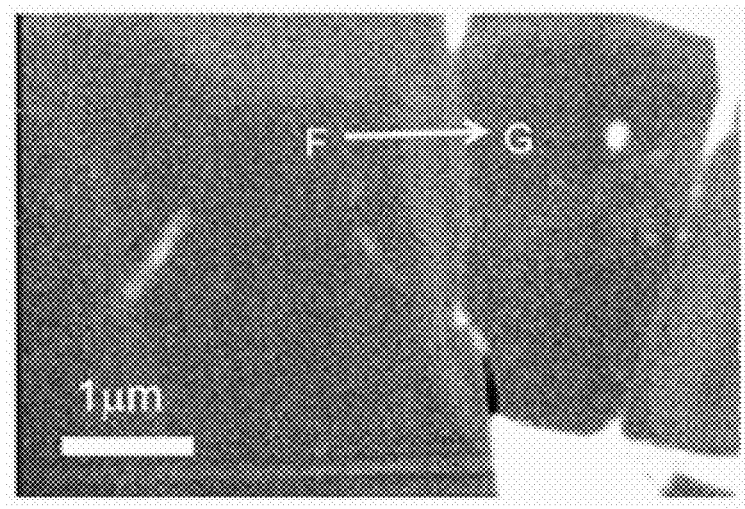
FIG. 4A is a scanning electron micrograph (reflected electron image) within 100 µm from the surface of the magnet body of Example 2 (M2)
Figure 4B:
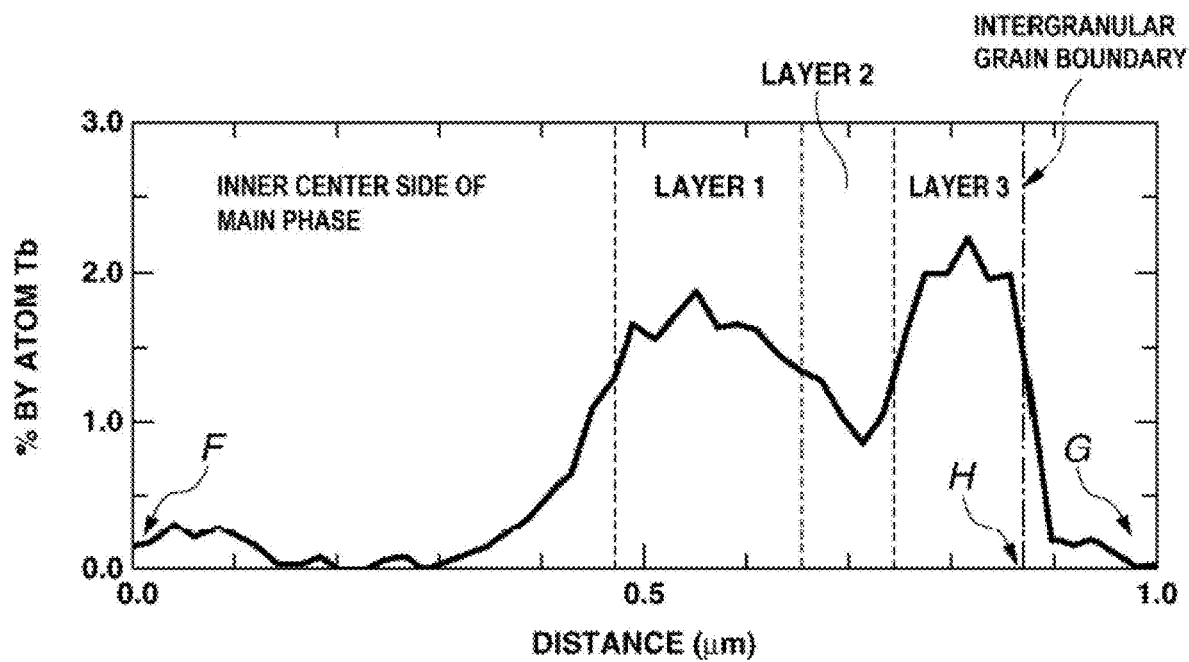
FIG. 4B is a graph illustrating a concentration profile of Tb at a line segment FG marked in FIG. 4A.

FIG. 4A illustrates a scanning electron micrograph (reflected electron image) within 100 μm from the surface of the magnet body of M2, and FIG. 4B illustrates the concentration profile of Tb at a line segment FG marked in the photograph. The measurement of the Tb concentration profile is the same as that in Example 1. As illustrated in FIGS. 4A and 4B, in M2, Tb is not present at the inner center side of the main phase particle, toward the outer shell, a layer having high Tb concentration, a layer having lower Tb concentration than that, and a layer having high Tb concentration again on the outermost side are recognized, and assuming that a point of intersection with the intergranular grain boundary on the line segment FG is set as H, the Tb concentration profile in the particle on the left side of the photograph including the line segment FH corresponds to the multiple (in this Example, triple) layers in the present invention similar to Example 1.

In addition, the magnetic properties (coercivity, residual magnetic flux density, and (BH) max) of the above-described magnet bodies M2, P2, and C2 were measured. The results are indicated in Table 1. As indicated in Table 1, compared with the coercivity of the magnet (P2) which is not subjected to the diffusion treatment, an enhancement in the coercivity of 850 kAm$^{-1}$ for the magnet M2 according to the present invention is recognized. In addition, the decrease in the residual magnetic flux density was 3 mT and there was almost no decrease of (BH) max. It is understood that the coercivity enhancing effect of the diffusion treated magnet C1 in the related art is 750 kAm$^{-1}$, which does not reach the amount of the coercivity enhanced in the present invention.

Example 3 and Comparative Examples 5 and 6

A thin alloy sheet consisting of 13.5 at % of Nd, 0.5 at % of Tb, 1.0 at % of Co, 0.2 at % of Al, 0.2 at % of Cu, 0.1 at % of Zr, 0.1 at % of Ga, 5.8 at % of B, and the balance of Fe was obtained by a strip casting method in which Nd, Dy, Co, Al, Fe, Cu, Zr, and Ga metal with a purity of 99% by weight or more and ferroboron were melted at a high frequency in an Ar atmosphere, and the molten metal was poured into a single copper roll. After exposing this alloy to 0.11 MPa of hydrogen at room temperature to occlude hydrogen, and then heated to 500° C. to partially release hydrogen while evacuating, cooled, and sieved to make a coarse powder having 50 mesh or less.

Subsequently, the above coarse powder was finely pulverized to a mass median particle diameter of 2.5 μm by a jet mill using a high pressure nitrogen gas. The obtained fine powder was formed into a block at a pressure of about 100 MPa while being oriented in a magnetic field of 1.2 MA/m under a nitrogen atmosphere. Next, the formed body was put into a sintering furnace in an Ar atmosphere, and sintered at 1,030° C. for 2 hours to prepare a sintered magnet block. This sintered magnet block was ground with a diamond cutter to a dimension of 7×7×6 mm in thickness (direction of orientation), then washed with an alkaline solution, pure water, nitric acid, and pure water in this order, and dried so as to obtain a sintered magnet body.

Next, the above-described sintered magnet body was immersed for 30 seconds into a suspension in which a dysprosium oxide powder was mixed with pure water at a weight fraction of 50% while applying ultrasonic waves. The average particle diameter of the dysprosium oxide powder was 0.25 μm. The magnet body pulled up from the suspension was dried for about 2 minutes by hot air of a drier. Thereafter, the magnet body covered with dysprosium oxide was subjected to the first diffusion treatment under the condition of 850° C. for 20 hours in an Ar atmosphere.

The magnet taken out of the furnace was immersed for 30 seconds into a suspension in which a neodymium hydroxide powder was mixed with pure water at a weight fraction of 50% while applying ultrasonic waves. The average particle diameter of the neodymium hydroxide powder was 0.4 μm. The magnet pulled up from the suspension was dried for about 2 minutes by hot air of a drier. Thereafter, the magnet body covered with neodymium hydroxide was subjected to the second diffusion treatment under the condition of 800° C. for 20 hours in an Ar atmosphere.

Furthermore, the magnet taken out of the furnace was immersed for 30 seconds into a suspension of dysprosium oxide and pure water used in the first diffusion treatment while applying ultrasonic waves. The magnet pulled up from the suspension was dried for about 2 minutes by hot air of a drier. Thereafter, the magnet body covered with dysprosium oxide was subjected to the third diffusion treatment under the condition of 800° C. for 30 hours in an Ar atmosphere.

The magnet body subjected to the diffusion treatment three times was further subjected to an ageing treatment in which a heat treatment was performed at 500° C. for 1 hour in vacuum and quenched, so as to obtain a sintered magnet body of the present invention. This sintered magnet body is set as a magnet body M3 (Example 3). For comparison, a magnet body P3 (Comparative Example 5) which was subjected to only the ageing treatment without the diffusion treatment, and a magnet body C3 (Comparative Example 6) which was subjected to only the first diffusion treatment and the ageing treatment were also prepared.

Figure 5A:
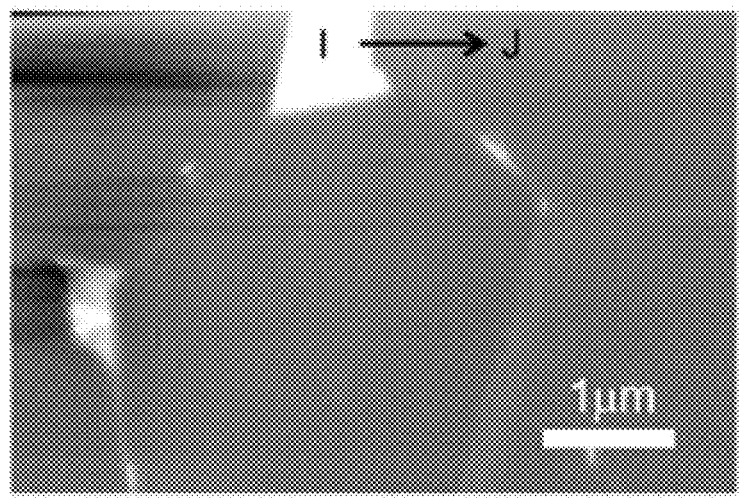
FIG. 5A is a scanning electron micrograph (reflected electron image) within 100 µm from the surface of the magnet body of Example 3 (M3)
Figure 5B:
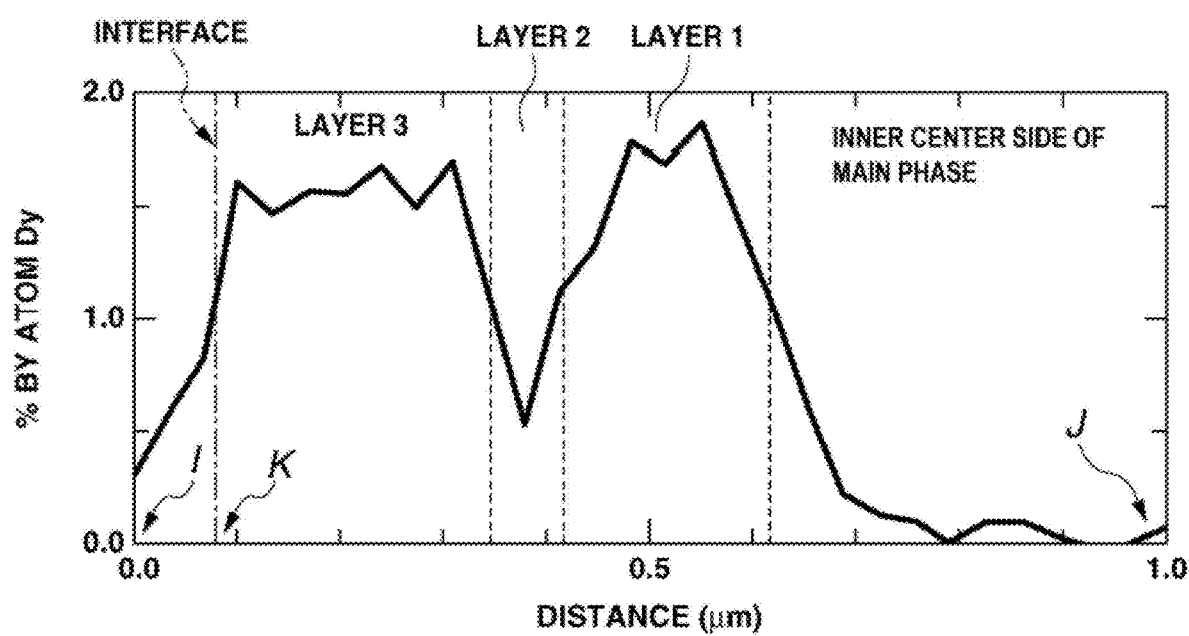
FIG. 5B is a graph illustrating a concentration profile of Dy at a line segment IJ marked in FIG. 5A.

FIG. 5A illustrates a scanning electron micrograph (reflected electron image) within 100 μm from the surface of the magnet body of M3, and FIG. 5B illustrates the concentration profile of Dy at a line segment IJ marked in the photograph. The measurement of the Dy concentration profile is the same as that in Example 1. As illustrated in FIGS. 5A and 5B, in M3, Dy is not present at the inner center side of the main phase particle, toward the outer shell, a layer having high Dy concentration, a layer having lower Dy concentration than that, and a layer having high Dy concentration again on the outermost side are recognized, and assuming that a point of intersection with the intergranular grain boundary on the line segment IJ is set as K, the Dy concentration profile in the particle on the right side of the photograph including the line segment JK corresponds to the multiple (in this Example, triple) layers in the present invention similar to the Tb concentration profile in Examples 1 and 2.

In addition, the magnetic properties (coercivity, residual magnetic flux density, and (BH) max) of the above-described magnet bodies M3, P3, and C3 were measured. The results are indicated in Table 1. As indicated in Table 1, compared with the coercivity of the magnet (P3) which is not subjected to the diffusion treatment, an enhancement in the coercivity of 620 kAm$^{-1}$ for the magnet body M3 according to the present invention is recognized. Note that, while Tb is diffused in Examples 1 and 2, Dy is diffused in this Example, and thus the amount of the coercivity enhanced is smaller than that in Examples 1 and 2. In addition, the decrease in the residual magnetic flux density was 7 mT and there was almost no decrease of (BH) max. It is understood that the coercivity enhancing effect of the diffusion treated magnet C3 in the related art is 410 kAm$^{-1}$, which does not reach the amount of the coercivity enhanced in the present invention.

As is apparent from the results of Examples 1 to 3 and Comparative Examples 1 to 6, the rare earth sintered magnet of the present invention having multiple layers in the main phase particle, and also multiple layers in the oxide phase can exhibit high magnetic properties, and according to the present invention, it was confirmed that an R—Fe—B-based sintered magnet having high performance and capable of reducing the amount of Tb or Dy used can be obtained.

TABLE 1

|  |  | $H_{cJ}$/kAm$^{-1}$ | $B_r$/T | (BH) max/kJm$^{-3}$ |
|---|---|---|---|---|
| Present Invention | M1 | 1985 | 1.420 | 393 |
| Comparative Example | C1 | 1785 | 1.422 | 394 |
| Comparative Example | P1 | 1035 | 1.425 | 396 |
| Present Invention | M2 | 2320 | 1.360 | 361 |
| Comparative Example | C2 | 2170 | 1.361 | 361 |
| Comparative Example | P2 | 1470 | 1.363 | 362 |
| Present Invention | M3 | 2060 | 1.380 | 371 |
| Comparative Example | C3 | 1850 | 1.385 | 374 |
| Comparative Example | P3 | 1440 | 1.387 | 375 |

Japanese Patent Application No. 2018-189121 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A rare earth sintered magnet which is a sintered magnet body consisting essentially of $R^1_a R^2_b T_c M_d B_e$ composition ($R^1$ is at least one element selected from rare earth elements including Sc and Y, and except for Tb and Dy, $R^2$ is one or two elements selected from Tb and Dy, T is Fe or Fe and Co, M is at least one element selected from the group consisting of Al, Cu, Zn, In, Si, P, S, Ti, V, Cr, Mn, Ni, Ga, Ge, Zr, Nb, Mo, Pd, Ag, Cd, Sn, Sb, Hf, Ta, and W, B is boron, a to e satisfy, by at % of the alloy composition, 12≤a+b≤17, 0.01≤d≤11, and 3≤e≤15, and the remainder is c), the magnet comprises a main phase particle having a Nd$_2$Fe$_{14}$B tetragonal structure, wherein a multi-layer main phase particle having multiple layers including a layer 1 having $R^2$ concentration, represented by at %, higher than that of a center of the particle, a layer 2 which is formed on the outside of the layer 1 and has $R^2$ concentration lower than that of the layer 1, and a layer 3 which is formed on the outside of the layer 2 and has $R^2$ concentration higher than that of the layer 2 is present at least in a portion in the vicinity of a surface of the main phase particle within at least 500 μm from a surface of the sintered magnet body.

2. The rare earth sintered magnet according to claim 1, wherein the multi-layer main phase particle is changed at a change rate of, by at %, 1%/nm or less in any case where the $R^2$ concentration is increased or decreased from the center of the particle to the layer 1, the layer 2, and the layer 3.

3. The rare earth sintered magnet according to claim 1, wherein values obtained by subtracting an average $R^2$ concentration of the center of the particle from the respective $R^2$ concentrations of the layer 1, the layer 2, and the layer 3 included in the multi-layer main phase particle are set as, by at %, C1, C2, and C3, when a maximum value of C1 is set as $C1_{max}$, a minimum value of C2 is set as $C2_{min}$, a maximum value of C3 is set as $C3_{max}$, and a smaller one value by comparison of $C1_{max}$ with $C3_{max}$ is set as $C_{max}$, $C1_{max}$ is 0.5% or more and 8% or less, $C2_{min}$ is 70% or less of $C_{max}$, and $C3_{max}$ is 0.5% or more and 8% or less, and C1, C2, and C3 satisfy $(C2_{min}+C_{max})/2 < C1 \leq C1_{max}$, $C2_{min} \leq C2 \leq (C2_{min}+C_{max})/2$, and $(C2_{min}+C_{max})/2 < C3 \leq C3_{max}$, respectively.

4. The rare earth sintered magnet according to claim 1, wherein a thickness of each of the layers 1 to 3 is 0.02 to 1.5 μm.

5. The rare earth sintered magnet according to claim 1, wherein in a particle which is adjacent to the multi-layer main phase particle via a crystal grain boundary phase, the multiple layers are not present in a region facing a region where the multiple layers of the multi-layer main phase particle are present.

6. The rare earth sintered magnet according to claim 1, wherein an oxide particle including $R^1$ and $R^2$ having a shape without a corner is present in at least a part of a triple junction surrounded by three or more of the main phase particles, and at least a part of the oxide particle is a multi-layer oxide particle having multiple layers including a layer A having $R^2$ concentration, represented by at %, higher than that of a center of the particle, a layer B which is formed on the outside of the layer A and has $R^2$ concentration lower than that of the layer A, and a layer C which is formed on the outside of the layer B and has $R^2$ concentration higher than that of the layer B.

7. The rare earth sintered magnet according to claim 6, wherein the multi-layer oxide particle is changed at a change rate of, by at %, 1%/nm or less in any case where the $R^2$ concentration is increased or decreased from the center of the particle to the layer A, the layer B, and the layer C.

8. The rare earth sintered magnet according to claim 6, wherein values obtained by subtracting an average $R^2$ concentration of the center of the particle from the respective $R^2$ concentrations of the layer A, the layer B, and the layer C included in the multi-layer oxide particle are set as, by at %, XA, XB, and XC, when a maximum value of XA is set as $XA_{max}$, a minimum value of XB is set as $XB_{min}$, a maximum value of XC is set as $XC_{max}$, and a smaller value of $XA_{max}$ and $XC_{max}$ is set as $X_{max}$, $XA_{max}$ is 1% or more and 20% or less,)($B_{min}$ is 70% or less of $X_{max}$, and $XC_{max}$ is 1% or more and 20% or less, and XA, XB, and XC satisfy $(XB_{min}+X_{max})/2 < XA \leq XA_{max}$, $XB_{min} \leq XB \leq (XB_{min}+X_{max})/2$, and $(XB_{min}+X_{max})/2 < XC \leq XC_{max}$, respectively.

9. The rare earth sintered magnet according to claim 6, wherein a thickness of each of the layers A to C is 0.05 to 1 μm.

10. The rare earth sintered magnet according to claim 6, wherein one or two or more elements selected from the group consisting of C, N, and F are contained in the oxide particle.

* * * * *